United States Patent
Pauley et al.

(10) Patent No.: US 11,554,994 B2
(45) Date of Patent: Jan. 17, 2023

(54) STABILIZED REFRACTORY COMPOSITIONS

(71) Applicants: Brian Pauley, Clayton, OH (US); Brittney Kennard, Clayton, OH (US); Douglas Doza, Plain City, OH (US); Dana Goski, Upper Arlington, OH (US); Kelley Wilkerson, Rolla, MO (US)

(72) Inventors: Brian Pauley, Clayton, OH (US); Brittney Kennard, Clayton, OH (US); Douglas Doza, Plain City, OH (US); Dana Goski, Upper Arlington, OH (US); Kelley Wilkerson, Rolla, MO (US)

(73) Assignee: ALLIED MINERAL PRODUCTS, LLC, Columbus, OH (US)

( * ) Notice: Subject to any disclaimer, the term of this patent is extended or adjusted under 35 U.S.C. 154(b) by 213 days.

(21) Appl. No.: 16/347,080

(22) PCT Filed: Nov. 3, 2017

(86) PCT No.: PCT/US2017/060008
§ 371 (c)(1),
(2) Date: May 2, 2019

(87) PCT Pub. No.: WO2018/085700
PCT Pub. Date: May 11, 2018

(65) Prior Publication Data
US 2020/0055787 A1    Feb. 20, 2020

(30) Foreign Application Priority Data

Nov. 3, 2016  (CN) .......................... 201610973754.4

(51) Int. Cl.
*C04B 14/04* (2006.01)
*C04B 14/06* (2006.01)
(Continued)

(52) U.S. Cl.
CPC ........ *C04B 40/0641* (2013.01); *C04B 14/045* (2013.01); *C04B 14/06* (2013.01);
(Continued)

(58) Field of Classification Search
CPC ... C04B 40/0641; C04B 14/045; C04B 14/06; C04B 14/10; C04B 14/303;
(Continued)

(56) References Cited

U.S. PATENT DOCUMENTS 3,483,012 A   12/1969   Young
3,649,317 A    3/1972   Houseknecht
(Continued)

FOREIGN PATENT DOCUMENTS

CA   2346341 A1   5/2001
CA   2346341 C    5/2001
(Continued)

OTHER PUBLICATIONS

Gogtas, Cem, "Development of Nano-ZrO2 Reinforced Self-Flowing Low and Ultra Low Cement Refractory Castables" (2012). Theses and Dissertations. 51. https://dc.uwm.edu/etd/51 (Year: 2012).*
(Continued)

*Primary Examiner* — Kevin E Yoon
*Assistant Examiner* — Marites A Guino-O Uzzle
(74) *Attorney, Agent, or Firm* — Porter Wright Morris & Arthur LLP

(57) ABSTRACT

A refractory composition including refractory aggregate, one or more matrix components, and silicate-coated set accelerator particles. The silicate-coated set accelerator particles can include one more of silicate-coated calcium (Continued)

hydroxide, magnesium hydroxide, calcium chloride, calcium carbonate, magnesium carbonate and calcium sulfate. Suitable silicate coatings include sodium silicate, potassium silicate, lithium silicate and mixtures thereof. A method of recovering an aged refractory composition, a settable composition and a method of manufacturing silicate-coated calcium hydroxide particles are also provided.

19 Claims, 5 Drawing Sheets

(51) Int. Cl.
| | |
|---|---|
| C04B 14/10 | (2006.01) |
| C04B 14/30 | (2006.01) |
| C04B 14/32 | (2006.01) |
| C04B 18/14 | (2006.01) |
| C04B 22/06 | (2006.01) |
| C04B 28/02 | (2006.01) |
| C04B 28/06 | (2006.01) |
| C04B 28/08 | (2006.01) |
| C04B 28/24 | (2006.01) |
| C04B 28/26 | (2006.01) |
| C04B 28/34 | (2006.01) |
| C04B 40/00 | (2006.01) |
| C04B 40/06 | (2006.01) |
| C04B 35/66 | (2006.01) |
| C04B 20/10 | (2006.01) |
| C04B 103/12 | (2006.01) |
| C04B 111/28 | (2006.01) |

(52) U.S. Cl.
CPC ............ *C04B 14/10* (2013.01); *C04B 14/303* (2013.01); *C04B 14/324* (2013.01); *C04B 18/146* (2013.01); *C04B 20/1074* (2013.01); *C04B 22/064* (2013.01); *C04B 28/021* (2013.01); *C04B 28/06* (2013.01); *C04B 28/08* (2013.01); *C04B 28/24* (2013.01); *C04B 28/26* (2013.01); *C04B 28/344* (2013.01); *C04B 35/66* (2013.01); *C04B 40/0042* (2013.01); *C04B 40/0046* (2013.01); *C04B 2103/12* (2013.01); *C04B 2111/28* (2013.01); *C04B 2235/3427* (2013.01)

(58) Field of Classification Search
CPC ... C04B 14/324; C04B 18/146; C04B 22/064; C04B 28/021; C04B 28/06; C04B 28/08; C04B 28/24; C04B 28/26; C04B 28/344; C04B 40/0042; C04B 40/0046; C04B 2103/12; C04B 2111/28; C04B 2235/3208; C04B 2235/3218; C04B 2235/3418; C04B 2235/3427; C04B 2235/447; C04B 2235/528; C04B 35/66; C04B 20/1074; C04B 7/02; C04B 7/00; C04B 40/0625; C04B 14/16; C04B 14/30; C04B 14/32; C04B 1/14; C04B 22/06; C04B 28/02; C04B 28/34; C04B 40/00; C04B 40/06; C04B 14/04; C04B 18/14; B22C 1/188

See application file for complete search history.

(56) References Cited

U.S. PATENT DOCUMENTS

| | | | |
|---|---|---|---|
| 3,650,784 A | 3/1972 | Albert et al. | |
| 3,778,494 A * | 12/1973 | Helser | C04B 28/18 |
| | | | 264/82 |
| 3,842,760 A | 10/1974 | Parsons et al. | |
| 4,284,433 A | 8/1981 | Aignesberger et al. | |
| 4,964,917 A | 10/1990 | Bobrowski et al. | |
| 5,215,585 A | 6/1993 | Luthra et al. | |
| 5,628,940 A | 5/1997 | Allison | |
| 5,634,972 A | 6/1997 | Pacanovsky et al. | |
| 5,650,004 A | 7/1997 | Yon | |
| 5,741,357 A | 4/1998 | Sheikh | |
| 5,954,872 A | 9/1999 | Benson | |
| 5,976,240 A | 11/1999 | Vezza | |
| 6,159,280 A | 12/2000 | Ryan | |
| 6,165,926 A | 12/2000 | Kriechbaum et al. | |
| 6,187,439 B1 | 2/2001 | Elwakil | |
| 6,444,316 B1 | 9/2002 | Reddy et al. | |
| 6,527,051 B1 | 3/2003 | Reddy et al. | |
| 6,554,071 B1 | 4/2003 | Reddy et al. | |
| 6,592,048 B2 | 7/2003 | Motoki et al. | |
| 6,840,318 B2 | 1/2005 | Lee et al. | |
| 6,926,851 B2 | 8/2005 | Colavito et al. | |
| 7,036,586 B2 | 5/2006 | Roddy et al. | |
| 8,425,940 B2 | 4/2013 | Lapidot et al. | |
| 8,974,594 B2 | 3/2015 | Miller et al. | |
| 2005/0005823 A1 | 1/2005 | Gourley et al. | |
| 2007/0241204 A1 | 10/2007 | Ohata et al. | |
| 2008/0245261 A1 | 10/2008 | Lindlar et al. | |
| 2013/0302613 A1 | 11/2013 | Gauckler et al. | |
| 2015/0129217 A1 | 5/2015 | Vorderbruggen et al. | |
| 2015/0231691 A1 | 8/2015 | Tanaka | |
| 2015/0315082 A1 | 11/2015 | Champion et al. | |
| 2020/0055787 A1 | 2/2020 | Pauley et al. | |

FOREIGN PATENT DOCUMENTS

| | | | |
|---|---|---|---|
| CN | 1993594 A | 7/2007 | |
| CN | 104072083 A | 10/2014 | |
| CN | 104903023 A | 9/2015 | |
| CN | 105565850 A | 5/2016 | |
| CN | 106116428 A | 11/2016 | |
| CN | 106747488 A | 5/2017 | |
| EP | 1264810 A1 | 12/2002 | |
| EP | 1709290 B1 | 12/2004 | |
| EP | 1777476 A1 | 4/2007 | |
| EP | 1971311 A1 | 9/2008 | |
| EP | 1531923 B1 | 8/2010 | |
| EP | 2774901 A1 * | 9/2014 | ......... C04B 20/1077 |
| ES | 2402670 T3 | 5/2013 | |
| FR | 2013651 A1 | 4/1970 | |
| JP | 2001348257 A | 12/2001 | |
| JP | 4226734 B2 | 2/2009 | |
| JP | 4498560 B2 | 7/2010 | |
| JP | 4636718 B2 | 2/2011 | |
| JP | 5113610 B2 | 1/2013 | |
| JP | 2015214430 A | 12/2015 | |
| JP | 2015214432 A | 12/2015 | |
| KR | 10-1254490 B1 | 4/2013 | |
| KR | 10-1368452 B1 | 3/2014 | |
| WO | 01/45759 A1 | 6/2001 | |
| WO | 03/038360 A1 | 5/2003 | |
| WO | 2007/078362 A1 | 7/2007 | |
| WO | 2012/134441 A1 | 10/2012 | |
| WO | WO-2014053699 A1 * | 4/2014 | ......... C04B 40/0039 |

OTHER PUBLICATIONS

Imperial Castable Refractory cement (SDS), [retrieved from internet on Mar. 2, 2022 <URL: https://cdn.industrypim.com/ASSETS/DOCUMENTS/ITEMS/EN/100040042_SDS_1.pdf>] (Year: 2015).*
Imperial Castable Refractory cement KK0061 through McLendon [retrieved from internet on Mar. 2, 2022 <URL: https://www.mclendons.com/2747205/product/imperial-kk0061>] (Year: 2015).*
Da Luz, Ana Paula et al., Refractory Castable Engineering, F.I.R.E. Compendium Series, p. 1-13 (2015).
Schmidtmeier, D. et al., The Value of Additives in Refractory Castables—Part 2: Castables with Silica Fume, Refractories Worldforum, vol. 6, No. 4, p. 51-60 (2014).
Sodium and Potassium Silicates, Versatile Compounds for your Applications, p. 1-16 (Oct. 2004).

(56) References Cited

OTHER PUBLICATIONS

PQ Corporation, Industrial Chemicals Division, PQ Sodium Silicates, Liquids and Solids, p. 1-20 (2004).
Kockegey-Lorenz, R. et al., The Value of Additives in Refractory Castables—Part 1: Castables without Silica Fume, Refractories Worldforum, vol. 6, No. 3, p. 75-81 (2014).
Parr, C. et al., The Advantages of Calcium Aluminate Cement as a Castable Bonding System, Technical Paper, p. 1-20 (2006).
International Search Report and Written Opinion from corresponding PCT Application No. PCT/US17/60008 dated May 4, 2018.
Supplementary European Search Report from corresponding European Application No. 17867774 dated Jun. 4, 2020.

* cited by examiner

STABILIZED REFRACTORY COMPOSITIONS

BACKGROUND

Monolithic refractory compositions are used for a variety of purposes such as lining or repairing furnaces and kilns, as well as for casting various shapes. In some cases, a monolithic refractory composition is manufactured in a dry state and then mixed with water and/or other liquids or solvents to produce a mixture similar in consistency to concrete. This aqueous or non-aqueous mixture can then be delivered to a structure, surface, or mold form via methods including, but not limited to, pumping, casting, or shotcreting. In another example, the monolithic refractory material can be pneumatically conveyed to a location adjacent to a structure, mixed with water or other liquid, and be delivered to the surface of a structure via a nozzle system. After mixing with water and/or other liquids or solvents the monolithic refractory mixture will set, or harden, after a period of time.

A known issue with refractory compositions is the change in hardening characteristics as they age. A fresh composition performs differently than one that is several weeks or months old. Typically, the reactivity of the composition will decrease with age, causing initial set times to become long and unpredictable. Even when stored under ideal conditions, moisture will react with fine components in the composition (e.g., fume silica, calcium aluminate cements, dispersant systems, etc.), resulting in delayed hardening times. The effects of aging are also difficult to predict. While the initial set times of two identical refractory compositions will be very similar at the time of manufacture, their set times can vary considerably as the compositions age.

In some instances a refractory composition only a few months old may not set (i.e., harden) within an acceptable period of time. While the addition of a set accelerator such as sodium hydroxide, sodium phosphates, lithium carbonate or sodium aluminate may allow the aged composition to harden, the effect of adding a set accelerator to an aged refractory composition is difficult to predict. Even the addition of a small amount of a set accelerator such as calcium hydroxide can cause the composition to begin set too quickly, resulting in a working time (the amount of time the hydrated composition can be moved into place before it gels or thickens too much) that is unacceptably short.

While a variety of devices and techniques may exist for providing refractory compositions that have adequate and consistent set times, it is believed that no one prior to the inventors have made or used an invention as described herein.

DETAILED DESCRIPTION

Figure 1:
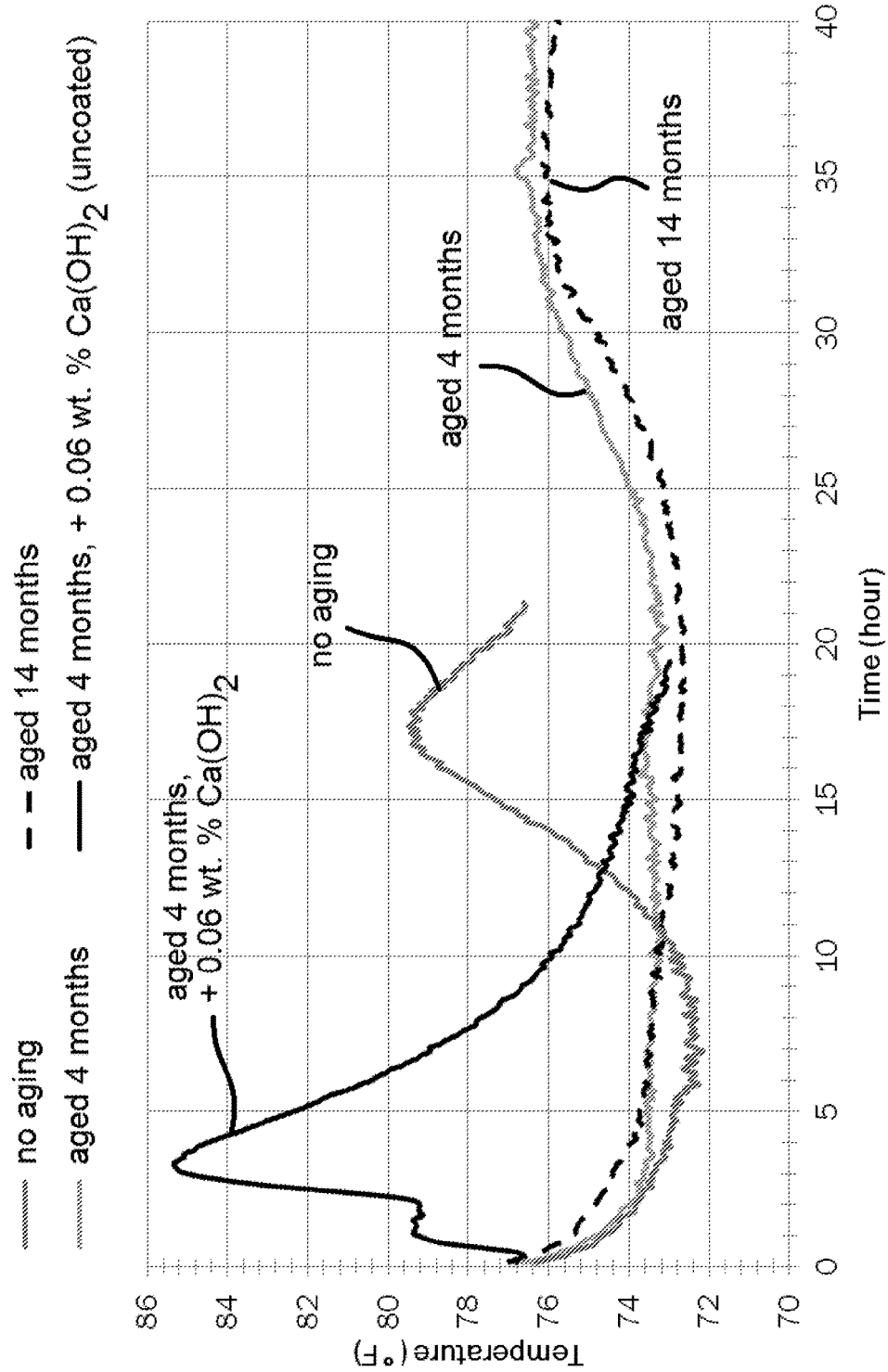
FIG. 1 depicts an exothermic plot for the setting of a low-cement castable refractory of various ages, without the addition of a silicate-coated set accelerator.
Figure 2:
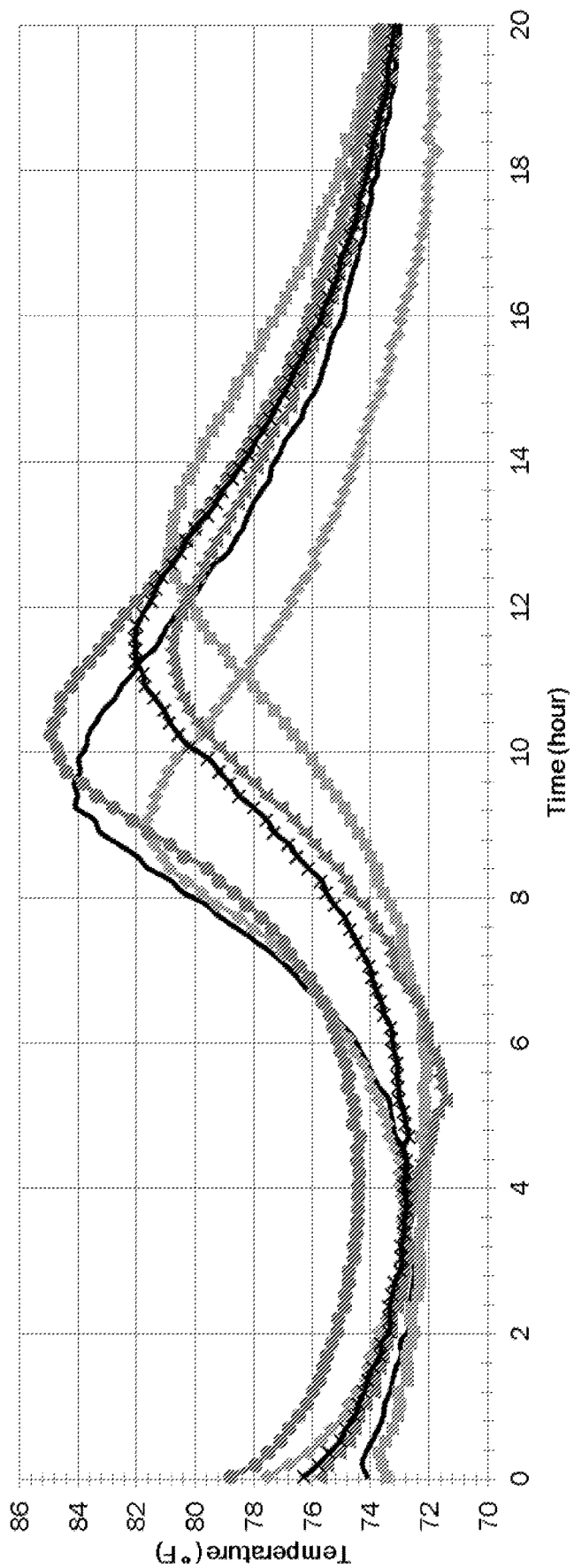
FIG. 2 depicts an exothermic plot for the setting of the low-cement castable refractory of FIG. 1 of various ages, wherein $Ca(OH)_2$ particles having a 30% by weight silicate coating were added to the refractory.
Figure 3:
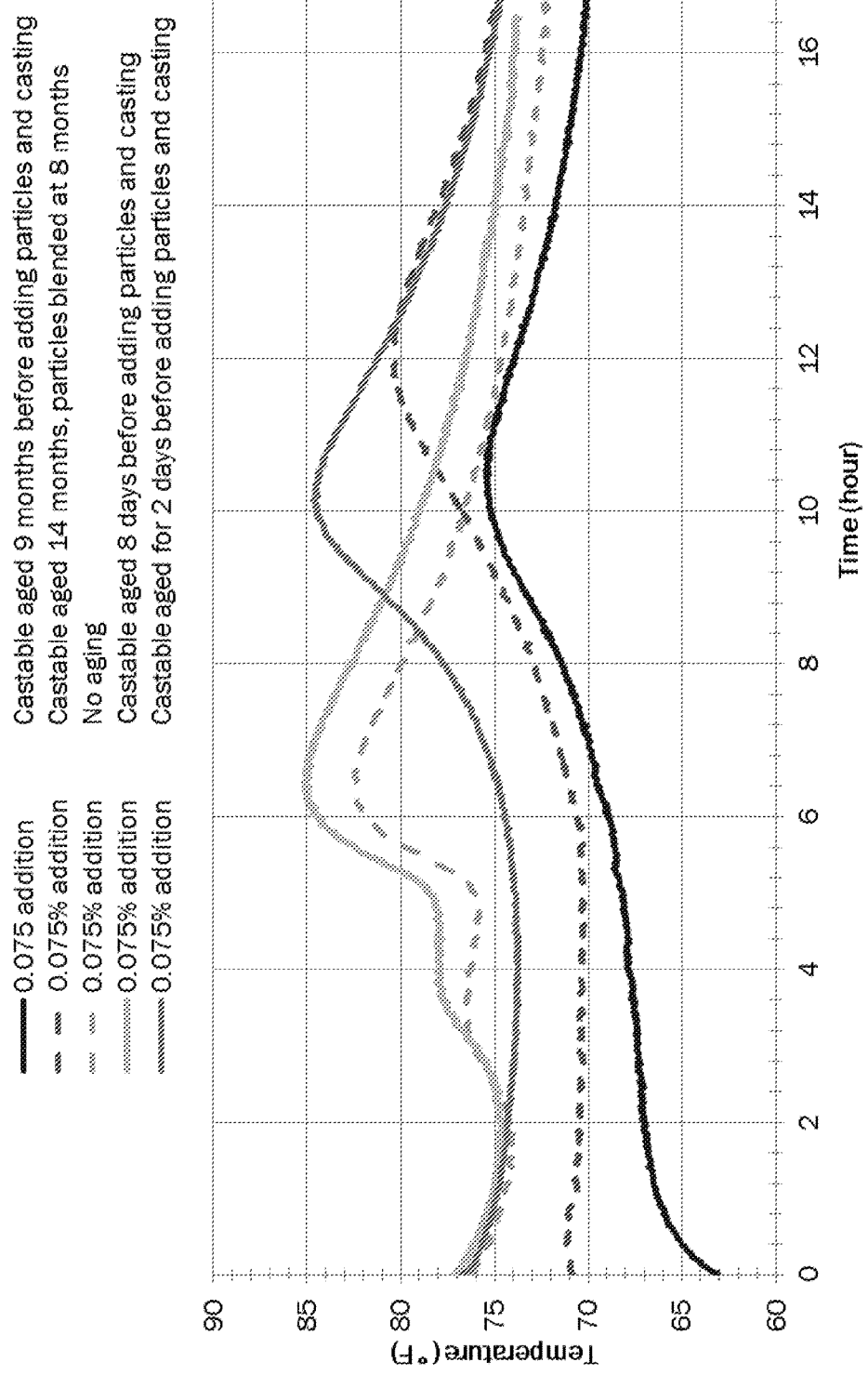
FIG. 3 depicts an exothermic plot for the setting of the low-cement castable refractory of FIG. 1 of various ages, wherein $Ca(OH)_2$ particles having a 20% by weight silicate coating were added to the refractory.
Figure 4:
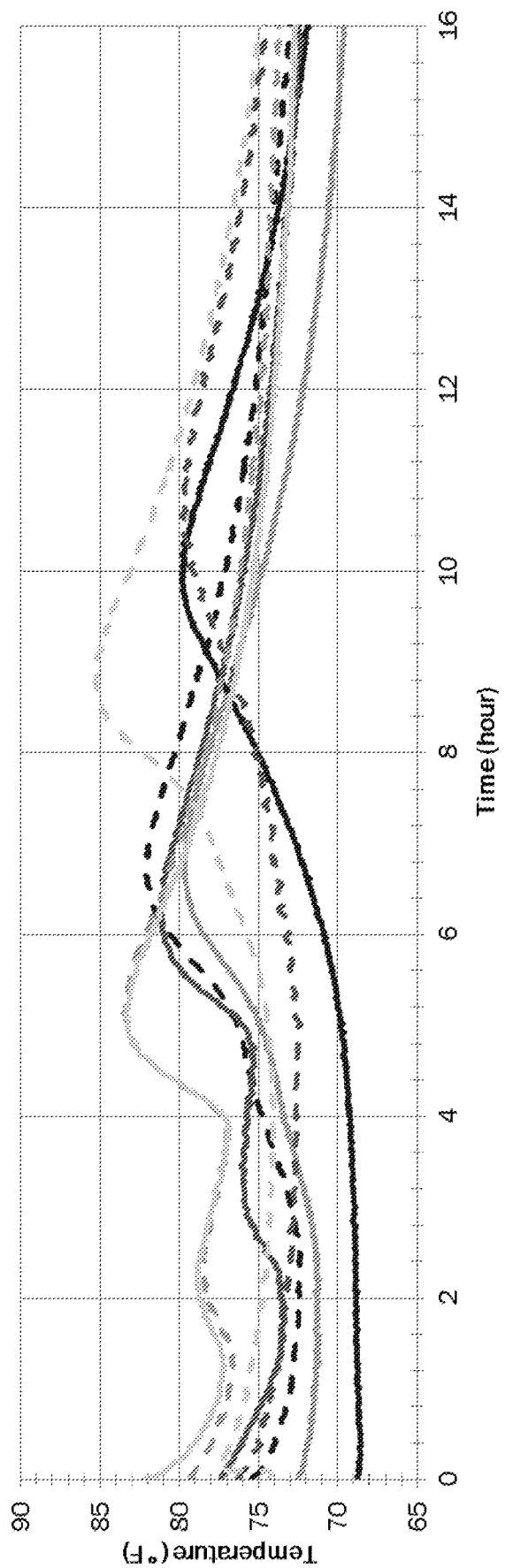
FIG. 4 depicts an exothermic plot for the setting of the low-cement castable refractory of FIG. 1 of various ages, wherein $Ca(OH)_2$ particles having a 10% by weight silicate coating were added to the refractory.

The following detailed description describes examples of embodiments of the invention solely for the purpose of enabling one of ordinary skill in the relevant art to make and use the invention. As such, the detailed description and illustration of these embodiments are purely illustrative in nature and are in no way intended to limit the scope of the invention, or its protection, in any manner. Unless indicated otherwise, all component percentages indicated herein are by weight.

The present invention provides settable refractory compositions comprising silicate-coated set accelerator particles. In some embodiments, the silicate-coated set accelerator particles comprise silicate-coated calcium hydroxide particles (e.g., sodium silicate coated). In some instances, the silicate-coated set accelerator particles are provided at the time the refractory composition is manufactured (as a dry mix), while in other instances the silicate-coated set accelerator particles are added to a dry mix refractory composition after that composition has aged (e.g., aged one month or more, four months or more, eight months or more, or even 10-12 months or more). In some embodiments, the silicate-coated set accelerator particles are added to a dry mix refractory composition that also includes a binder (e.g., calcium aluminate cement). In alternative embodiments the silicate-coated set accelerator particles are added to a dry mix refractory composition that does not include a binder, but which is combined with an aqueous binder-containing solution on site in order to initiate setting.

Embodiments of the present disclosure provide monolithic refractory compositions that include a silicate-coated set accelerator (e.g., calcium hydroxide) in order to not only reduce the initial set time, but also stabilize the composition during storage such that the composition is still settable within an acceptable period of time even after prolonged storage. The inventors have discovered that, even though silicates such as sodium silicate act as set accelerators for some monolithic refractory formulations, when used as a coating on, for example, calcium hydroxide particles, the silicate coating will delay the action of the calcium hydroxide. As a result, the initial set time of the refractory composition is decreased, and the effect of product aging on set time is diminished. Even though the initial set time of both fresh and aged compositions is decreased, the difference in initial set time between fresh and aged compositions is reduced. Thus, set times are more predictable and consistent, even after prolonged storage.

While the silicate-coated set accelerator can be added to the refractory composition at the time of manufacture, the inventors have also found that similar effects are achieved even when the silicate-coated accelerator is added to aged refractory compositions. This additional discovery provides a method for recovering aged compositions that would otherwise not have set in an acceptable amount of time.

The stabilizing set accelerator described herein can be incorporated into a wide variety of known and hereafter developed monolithic refractory compositions, including, but not limited to, conventional ("regular"), low-cement, ultra-low cement and cement-free ("no-cement") monolithics. As is known to those skilled in the art, and as set forth in ASTM C-401, conventional (or regular) refractory compositions have a total CaO content of greater than 2.5% (by weight) on a calcined basis, low-cement refractory compositions have a total CaO content of greater than 1.0% up to 2.5% on a calcined basis, ultra-low cement refractory compositions have a total CaO content of greater than 0.2% up to 1.0% on a calcined basis, and no-cement refractory compositions have a total CaO content of no more than 0.2% on a calcined basis.

The stabilizing set accelerator described herein can be incorporated into castable compositions requiring vibration for flowing as well as those having self-flow consistency. The stabilizing set accelerator described herein also can be incorporated into sprayable compositions, including gunnable compositions (i.e., compositions designed to be applied pneumatically, with liquid, e.g., water, injected at a nozzle prior to discharge), and shotcreting compositions (i.e., compositions designed to be mixed with a liquid, e.g., water, and then pumped to a nozzle for pneumatic discharge). The stabilizing set accelerator does not alter the application, curing or firing processes typically used for these monolithic refractory compositions.

The monolithic refractory compositions comprise a premixed, dry particulate system containing the stabilizing set accelerator along with coarse grains (i.e., refractory aggregate), matrix components (i.e., fine filler(s)), and in some instances one or more admixtures). A binder is also required, either included in the dry mix or added to the dry mix at the time of use (i.e., mixed with the dry mix immediately prior to use). The various raw materials used will vary depending on the desired physical and chemical properties of the final hardened product.

Any of variety of hydraulic binders (i.e., binders that react with water and harden) and non-hydraulic (chemical) binders can be used in the refractory compositions of the present disclosure. The binder provides green strength to the composition prior to firing. Suitable hydraulic binders include calcium aluminate cement and hydratable alumina (also referred to as rho alumina).

Suitable chemical (i.e., non-hydraulic) binders include phosphate binders, alkali silicate binders (e.g., sodium silicates), colloidal silica and colloidal alumina. Suitable phosphate binders include, but are not limited to: (a) phosphoric acids; and (b) solid or liquid solutions of aluminum, sodium, calcium, magnesium, ammonium, or potassium phosphate salts.

By way of one example, a sodium silicate binder can be used (air setting refractory mixtures). In some instances, dry sodium silicate is added as part of the dry refractory composition, with water added on site to form a refractory mixture that, after casting or spraying, will air dry and harden. In other instances a liquid (e.g., aqueous) solution of sodium silicate (as a binder) is added to the dry mix on site and the resulting mixture, after casting or spraying, will air dry and harden.

A variety of aluminum phosphate binders are known to those skilled in the art, and can be added to the dry mix (along with aggregate, matrix components and optional admixtures) or combined with the dry mix on site as a liquid solution just prior to casting or spraying. One commonly employed aluminum phosphate is monoaluminum phosphate, $Al(H_2PO_4)_3$, which can be used in combination with a setting agent such as MgO or other alkaline earth metal oxide.

Acid binders can also be used, such as orthophosphoric acid or a liquid solution of monoaluminum phosphate. In this instance the binder is added on site as a liquid (e.g., aqueous) solution immediately prior to use of the refractory composition rather than being included in the dry mix prepared ahead of time. In these instances, the blended dry mix components (aggregates and matrix components) will typically include a setting agent such as $Al_2O_3$, MgO or other alkaline earth metal oxide.

Similarly, alkaline activated binders such as fly ash or furnace slag (also known as geopolymer cements or GPCs) can also be used. These GPCs rely on the polycondensation of alumina and silica from the source binder materials when reacted with silicates and/or hydroxides. These GPC binders can be added to the dry mix or combined with the dry mix on site as a liquid solution just prior to casting or spraying.

Other chemical binders including colloidal alumina, colloidal silica, and other silica gel bond systems can also be used. In the case of colloidal alumina and colloidal silica, these bonding systems are combined with the dry mix on site as a liquid solution just prior to casting or spraying. In the case of other silica gel bonded systems (e.g., microsilica-gel bonded no-cement castables), a microsilica binder (e.g., fume silica) can be included in the dry mix itself, and activated on site by combining the dry mix with water. The water addition will cause the microsilica to gel (i.e., set).

The amount of binder included in the dry mix or added to the dry mix at the time of use will vary depending on the type of binder, as well as the application method (e.g., castable vs. gunning) and intended use (e.g., the environment to which the refractory composition will be exposed after installation). For calcium aluminate cement ("CAC"), the amount included in the refractory composition dry mix will vary depending on, among other things, the alumina content of the calcium aluminate cement.

In some embodiments, the refractory composition employs commercially available 50%-80% alumina content CAC as a binder, with the dry mix comprising between 1% and 30% by weight CAC (e.g., 50% alumina CAC, 60% alumina CAC, 70% alumina CAC or 80% alumina CAC). In other embodiments, the dry mix comprises between 3% and 10% CAC (e.g., 50% alumina CAC, 60% alumina CAC, 70% alumina CAC or 80% alumina CAC). In still further embodiments, the dry mix comprises between 10% and 25% CAC (e.g., 50% alumina CAC, 60% alumina CAC, 70% alumina CAC or 80% alumina CAC). In additional embodiments, the dry mix comprises between 1% and 3.5% CAC (e.g., 50% alumina CAC, 60% alumina CAC, 70% alumina CAC or 80% alumina CAC).

In other embodiments, the refractory composition employs hydratable alumina ("HA") as a binder, with the dry mix comprising between 1% and 15% by weight HA. In other embodiments, the dry mix comprises between 2% and 10% HA.

In still further embodiments, the dry mix comprises a combination of two or more binders such as CAC and HA. In one embodiment, the dry mix comprises a ration of HA:CAC of between 1:9 and 9:1. For example, some dry mix embodiments comprise 1%-8% CAC combined with 0.5%-5.5% HA. Other embodiments comprise 3%-9% CAC combined with 2%-6% HA.

Other embodiments of a dry mix refractory composition containing a binder comprise 4%-12% of a dry phosphate binder (e.g., $Al(H_2PO_4)_3$). Still further embodiments comprise 1%-15% of an alkali silicate binder. In other embodiments employing a liquid binder solution on site, about 8%-15% phosphoric acid binder (i.e., 8-15 parts phosphoric acid in the liquid binder solution per 100 parts of the refractory dry mix) as a liquid solution is combined with a binder-free dry mix. In yet another embodiment, about 6%-18% colloidal silica or 0.1%-4.5% colloidal alumina, as a liquid solution, is combined with a binder-free dry mix.

Any of a variety of refractory aggregates can be used in the refractory compositions. Aggregate is used in a range of sizes (e.g., 20 mm to 100 μm), typically optimized using known mathematical modeling techniques, in order to control porosity, flowability, liquid demand, and mechanical strength. In general, aggregate comprises particles having a grain size ranging from 100 μm to 20 mm. Suitable refractory aggregate includes one or more of the following: alumina (including tabular, white fused, and brown fused alumina), bauxite, mullite, bauxitic kaolin, andalusite, calcined kaolin, chamotte, calcined flint clay, pyrophyllite, fused silica, bubble alumina, lightweight clay grog, bubble fly ash, perlite, haydite, vermiculite, fused or sintered magnesia alumina spinels, fused or sintered alumina-zirconia-silica, magnesia, calcium hexaluminate, fused calcium aluminate clinker, sintered calcium aluminate clinker, and lightweight calcium hexaluminate.

The monolithic refractory compositions can be formulated with a wide range of aggregate types, sizes and amounts. For example, some of the refractory compositions of the present disclosure comprise 15% to 80% aggregate, which can be one or more types of aggregates such as calcined flint and chamotte. In other embodiments the refractory composition comprises 40% to 80% aggregate. In still further embodiments, the refractory composition comprises 15% to 35% aggregate.

The refractory compositions of the present disclosure further comprise one or more refractory matrix components (also known as fines, fine filler, or filler) in the form of particles having a grain size generally less than 100 μm in order to, for example, tailor flow properties, fill voids between aggregate particles, and improve bonding and mechanical strength. Suitable matrix components include one or more of the following: calcined alumina, reactive alumina, silicon carbide, quartz silica, fume silica (also referred to as "silica fume"), magnesia, kyanite, mullite, spinel ($MgAl_2O_4$), clay, zircon, graphite, and fly ash. The binder, in addition to providing green strength, can also perform one or more functions of a matrix component.

The monolithic refractory compositions can be formulated with a wide range of matrix component types, sizes and amounts. For example, some of the refractory compositions of the present disclosure comprise 15% to 60% of one or more matrix components, which can be one or more types of matrix components such as a combination of fine alumina, calcined alumina, and fume silica. In some embodiments, the refractory composition comprises 45% to 60% matrix components. In other embodiments, the refractory composition comprises 30% to 50% matrix components. In still further embodiments, the refractory composition comprises 15% to 35% matrix components.

The refractory compositions of the present disclosure typically further comprise one or more admixtures for enhancing or otherwise altering the performance, set time, flow properties, water requirement, mechanical strength, permeability, alkali resistance and/or non-wetting of the refractory composition or resulting refractory material formed therefrom. In some embodiments, the dry mix of the refractory composition comprises up to 5% by weight of one or more admixtures. In other embodiments up to 3% by weight of admixtures are included, and in still further embodiments up to 1% by weight of admixtures are included. Suitable admixtures include one or more dispersants, deflocculants, set accelerators, set retarders, burn-out fibers, flow modifiers, and molten metal anti-wetting agents such as barium sulfate or calcium fluoride.

By way of example, the monolithic refractory compositions of the present disclosure can include one or more dispersants or deflocculants, organic or inorganic or a mixture thereof. Dispersants and deflocculants are used to facilitate mixing of the dry mix with water (or with an aqueous binder solution, also known as an activator), as well as to improve the flow properties of the resulting mixture and thereby reduce the amount of water necessary for flowability (i.e., reduce water demand). When included, the refractory composition comprises up to about 1% by weight of dispersant, or up to about 0.5% by weight of dispersant, or up to about 0.1% by weight of dispersant, wherein one or more dispersants may be employed. When included, the refractory composition comprises up to about 1% by weight of deflocculant or up to about 0.5% by weight of deflocculant, or up to about 0.1% by weight of deflocculant, wherein one or more deflocculants may be employed. Combinations of dispersants and deflocculants can also be employed.

Suitable dispersants include, for example: condensed phosphates such as sodium tetrapolyphosphate or sodium hexametaphosphate; carboxylates such as sodium polycarboxylate; polyacrylates such as sodium polyacrylate, ammonium polyacrylate, sodium polymethacrylate, or ammonium polymethylacrylate; sulfonates such as sodium polynaphthalene sulfonate or sodium lignosulfonate; polycarboxylate ethers; and polyethylene glycol-based polymers.

Suitable deflocculants include, for example, ammonium salts of polyelectrolytes, polyacrylic acids, and carboxylic acid preparations.

Some commercially available products combine one or more dispersants with reactive alumina and either a set accelerator or a set retarder. These products, sometimes referred to as dispersing aluminas, can also be used, and are available for example, from Almatis Inc. as ADS 1, ADS 3, ADW 1, M-ADS 1, M-ADS 3 and M-ADW 1.

By way of further example, the monolithic refractory compositions of the present disclosure can include one or more set accelerators or set retarders. Set accelerators accelerate or shorten the setting time, while set retarders increase the setting time. Suitable set accelerators include, but are not limited to, lithium carbonate, sodium silicate, sodium aluminate, lithium citrate, potassium silicate, potassium aluminate, potassium carbonate, sodium carbonate, sodium tetrapolyphosphate, sodium hexametaphosphate, and hydrated lime. Suitable set retarders include, but are not limited to, boric acid, citric acid, tartaric acid, oxalic acid, malonic acid, lignin sulfonate, sodium bicarbonate, and alkali gluconates.

The refractory compositions may also include various organic burn-out fibers or non-organic fibers known to those skilled in the art.

As mentioned previously, the monolithic refractory compositions of the present invention include a silicate-coated set accelerator (e.g., calcium hydroxide) that not only reduces the initial set time, but also stabilizes the composition during storage. Even though silicates such as sodium or potassium silicate act as set accelerators, when provided as a dry coating on particles of an alkaline set accelerator such as calcium hydroxide, the silicate coating delays the action of the calcium hydroxide. As a result, while the initial set time of the refractory composition is decreased, it remains within acceptable limits.

More surprisingly, the effect of product aging on set time is greatly diminished, and the difference in initial set time between fresh and aged compositions is reduced. Thus, set times are more predictable and consistent. In some instances, the silicate-coated set accelerator is added to the dry mix refractory composition at the time of manufacture. In other instances, the silicate-coated set accelerator is added to the refractory composition after a period of storage, such as immediately prior to use of the refractory composition. In this latter instance, the addition of the silicate-coated set accelerator can be used to recover aged compositions that would otherwise not set in an acceptable amount of time.

The silicate coatings described herein can be applied to a variety of different set accelerators, including calcium hydroxide, magnesium hydroxide, calcium chloride, calcium carbonate, magnesium carbonate, lithium carbonate, calcium sulfate and similar compounds known to those skilled in the art to be set accelerators. Of these, silicate-coated calcium hydroxide particles are particularly useful.

A variety of methods may be used to coat the set accelerator particles with silicate. For example, set accelerator particles (e.g., $Ca(OH)_2$) can be mixed with an aqueous silicate solution (e.g., sodium silicate or potassium silicate) and heated to a temperature of between 40 and 80° C. in order to reduce the viscosity of the mixture and facilitate coating of the $Ca(OH)_2$ particles. Silicate solutions of higher solids content (e.g., ≥20% solids) are rather viscous at room temperature, but their viscosity decreases significantly upon heating. Therefore, heating is desirable, particularly when using silicate solutions having a solids content ≥20% by weight, in order to facilitate coating of the particles. In some instances, an anti-caking agent is added to the mixture in order to reduce or eliminate the tendency for undesirable agglomeration of the coated particles during manufacture, packaging or storage. Suitable anti-caking agents include silica, talc, sodium aluminosilicate, diatomaceous earth, clay, cellulose, stearic acid, polymer particles, and mixtures of one or more of the foregoing. Suitable polymers for use as anti-caking agents include, but are not limited to, polydimethylsiloxane, and hydrolyzed acrylonitrile copolymers such as those described in U.S. Pat. No. 6,124,391.

After sufficient mixing to coat the particles, the coating on the particles is solidified (e.g., by slight dehydration and/or a gelation reaction from exposure of the silicate to $CO_2$ present in the ambient atmosphere). If desired, the coated particles are thereafter separated into various size fractions using, for example, conventional sieve processes. Since there will be some agglomeration of the coated particles, the coated particles will generally be larger in size than the starting material. In some embodiments, the coated particles are sieved to provide a particle size of 2.5 mm (8 mesh) or smaller, or 1.5 mm (14 mesh) or smaller. In still further embodiments, the coated particles have a particle size of between 2.4 mm (8 mesh) and 0.15 mm (100 mesh), or between 2.4 mm (8 mesh) and 0.6 mm (30 mesh), or between 0.85 mm (20 mesh) and 0.19 mm (75 mesh).

Various grades of silicate can be used in the coating process. By way of example, when sodium silicate is used, the ratio of $SiO_2:Na_2O$ (by weight) can be between 1.6:1 and 3.3:1. When potassium silicate is used, the ratio of $SiO_2:K_2O$ can be between 1.8:1 and 2.6:1. For lithium silicate, in one embodiment the ratio of $SiO_2:Li_2O$ can be 8.2. It will be understood, however, that various other grades of these silicates can be used. In addition, the particles can be coated with a combination of two or more silicates (e.g., sodium silicate and potassium silicate).

The amount of the silicate coating, as a % by weight of the coated particles (including any anti-caking agent) can be readily controlled simply by adjusting the amount of silicate added during the coating process. For example, particles having a silicate coating comprising 1% to 99% by weight can be prepared. In some embodiments, particles having a silicate coating comprising 5% to 70% by weight are prepared for use in the refractory compositions. In other embodiments particles having a silicate coating comprising 5% to 60% by weight, or 10% to 50% by weight, or 20% to 40% by weight, or 30% by weight.

The amount of silicate-coated set accelerator particles added to the refractory composition will vary depending on the nature of the refractory composition, the desired setting properties (e.g., initial set time and/or working time), the level of coating and the type of set accelerator. For silicate-coated $Ca(OH)_2$ particles, in some embodiments the amount added to the refractory composition is between 0.01% and 0.5% by weight, between 0.01% and 0.2% by weight, between 0.05% and 0.5% by weight, between 0.05% and 0.2% by weight, or between 0.05% and 0.1% by weight. In one particular embodiment, sodium silicate-coated $Ca(OH)_2$) particles having a coating level of 20% to 40% by weight are added to the refractory composition at a level of 0.05% to 0.1% by weight of the dry mix.

In some embodiments the refractory compositions comprising a binder, aggregate, matrix components and silicate-coated set accelerator particles (e.g., calcium hydroxide), when tempered (i.e., mixed with water or other suitable liquid), exhibit (a) an initial set time at the time of manufacture of between 1 and 20 hours, or between 1 and 10 hours; and/or (b) after 1 to 18 months of aging, a change in initial set time of less than 25% (compared to the initial set time at the time of manufacture), or less than 15%. In still further embodiments, the refractory compositions comprising a binder, aggregate, matrix components and silicate-coated set accelerator particles (e.g., calcium hydroxide), when tempered (i.e., mixed with water or other suitable liquid), exhibit (a) an initial set time at the time of manufacture of between 1 and 20 hours, or between 1 and 10 hours; and (b) after 1 to 18 months of aging, a change in initial set time of less than 8 hours compared to the initial set time at the time of manufacture, or less than 5 hours compared to the initial set time at the time of manufacture.

While the following examples demonstrate the aging benefits of sodium silicate-coated $Ca(OH)_2$ particles in a calcium aluminate cement-based refractory composition, these particles will provide similar benefits when used in refractory compositions based on other bonding systems described herein.

Example 1

Preparation of Sodium Silicate-Coated $Ca(OH)_2$ Particles

Silicate-coated $Ca(OH)_2$ particles were prepared by mixing calcium hydroxide and an aqueous sodium silicate solution, heating this mixture to about 70° C. until it became a free-flowing solid, and thereafter adding diatomaceous earth as an anti-caking agent. The resulting particles are then sized using mesh screens.

For example, calcium hydroxide (300 g) and a sodium silicate solution (434 g of an aqueous solution that was nominally 26.5% solids) were added to a 1000 mL beaker. The solution was mixed for 20 minutes at 100 rpm. Diatomaceous earth (10 g) was then added as an anti-caking agent. The resulting mixture was stirred at 100 rpm and heated to a temperature of 70° C. until it became a free-flowing solid. The mixture was cooled to ambient temperature, dried and screened in order to provide particles having a particle size of 1.5 mm and finer. The resulting silicate-coated particles had a $Ca(OH)_2$ content of 70.6% (by weight)—also referred to in the examples herein as 30% silicate-coated $Ca(OH)_2$ (wherein the coating % is based on total solids content, as any volatiles including water are removed during drying. Particles of silicate-coated $Ca(OH)_2$ with coating levels of 5 to 50% were prepared in the same manner, with appropriate adjustments in the amounts of the starting materials.

For Examples 2-4 below, the following low cement castable compositions were prepared in the conventional manner, wherein the amount of each identified component is provided as the % by weight of the total composition:

TABLE I

|  | C1 | C2 | C3 | C4 |
|---|---|---|---|---|
| Course calcined flint and chamotte | 77.3 | 62.3 | 52.5 | 48.8 |
| Fine alumina (>90% $Al_2O_3$) |  | 22 | 12 | 22 |
| SiC |  |  | 8.3 |  |
| Calcined Alumina | 8.5 | 4 | 13 | 14 |
| Fume Silica | 7.5 | 7.5 | 7 | 8 |
| Calcium aluminate cement | 6.5 | 4 | 7 | 7 |
| Dispersing and set time additives | 0.2 | 0.2 | 0.2 | 0.2 |

Example 2

Demonstration of Refractory Composition Aging without $Ca(OH)_2$ Present

An extensive study was conducted in order to demonstrate the effect aging has on refractory compositions, specifically set time. For calcium aluminate cement-bonded monolithics such as C1, setting time can be monitored via an exothermic heat of evolution test according to ASTM C1656-13. Composition C1 of TABLE 1 above was tested (i.e., cast) the same day as manufacture, after aging for about 4 months, and after aging about 14 months. During aging, the dry composition C1 was stored in a sealed plastic bag, and placed in a non-climate controlled warehouse in order to replicate typical storage conditions.

For testing, the composition C1 was mixed with 6.5% by weight of water in a tabletop mixer until sufficiently mixed. The mixture was then poured into a container for casting, and a thermocouple inserted into the mixture to measure the temperature during setting. The thermocouple recorded the heat evolved during the curing and hardening stage of the refractory composition, and the temperature plotted against time (see FIG. 1).

Many castables exhibit two peaks in a temperature vs. time plot, indicating the end of working time and final strength formation. The first peak is typically referred to as the "initial set" and the second peak is referred to as the "final set." For low cement castables such as those used in the examples reported in the present application, it is not uncommon to see a single temperature peak (as seen in FIG. 1). For purposes of describing the tests reported herein, when only a single peak is present in the temperature v. time plot, this peak will be referred to as the initial set time.

As seen in FIG. 1, the initial set time for fresh C1 (no aging) was approximately 17 hours (the peak of the exothermic plot). After just four months of aging, the initial set time has increased to 30+ hours and the temperature peak is much shallower and less defined (i.e., broader), indicating that the composition has aged and is much less reactive. For the composition tested after 14 months of aging, the samples tested were still soft after 30+ hours from cast time. Thus, the setting times for both the 4-month and 14-month aged compositions would be unacceptable, and therefore a set accelerator would need to be added in the field in order to improve the set time and setting properties to acceptable levels. Furthermore, the setting time of aged refractory compositions tends to be unpredictable, making it difficult to know in the field whether a setting accelerator will be needed and how much should be added.

While $Ca(OH)_2$ is a well-known set accelerator, simply adding conventional $Ca(OH)_2$ to a fresh or aged composition can be problematic. For example, adding even a small amount of $Ca(OH)_2$ to a refractory composition at the time of manufacture will result in a product that sets far too rapidly for most applications. In order to demonstrate the effect of adding conventional (uncoated) $Ca(OH)_2$ to an aged refractory composition, 0.06 weight % of $Ca(OH)_2$ was added to composition C1 (i.e., 0.06 parts per 100 parts of C1, by weight) after the composition had aged about 4 months. As seen in FIG. 1, this small addition of $Ca(OH)_2$ resulted in an initial set time of about one hour. While a significant decrease in initial set time over the non-modified composition aged 4 months was achieved, an initial set time of one hour will be too short for some applications. More significantly, adding conventional, uncoated $Ca(OH)_2$ at the time of manufacture is not practical since the composition would be unusable (due to an impractically short initial set time for the fresh composition), and its effectiveness would diminish with storage time.

Example 3

Set Times of Aged Refractory Compositions after Addition of Silicate-Coated $Ca(OH)_2$ Silicate-coated $Ca(OH)_2$ particles having various coating levels were prepared in accordance with EXAMPLE 1. Various amounts of silicate-coated $Ca(OH)_2$ particles, having various coating levels, were added to composition C1 that had been aged between about 4-9 months. Following the procedure of Example 2, the initial set time was determined for each sample composition, as reported in TABLE 2 below.

TABLE 2

| | Initial Set Time (hours) | | | | | | |
|---|---|---|---|---|---|---|---|
| | Level of silicate coating on $Ca(OH)_2$ | | | | | | |
| % addition to C1 | 50% | 40% | 30% | 20% | 15% | 10% | 5% |
| 0.015 | 34 | 21 | 14 | 17 | 22 | — | |
| 0.06 | 30 | 18 | 11 | 12 | 12.5 | 7 | 11 |
| 0.063 | | | | | | | 10 |
| 0.067 | | | | | | 6.5 | |
| 0.071 | | | | | 10.5 | | |
| 0.075 | | | | 10 | | | |
| 0.086 | | | 9 | | | | |
| 0.1 | | 15 | | | | | |
| 0.12 | 23 | 14 | 9 | | | | |

EXAMPLE 2 (and FIG. 1) shows that composition C1 exhibited an initial set time of more than 30 hours after being aged at least 4 months. As seen in TABLE 2 above, however, the addition of even a small amount of silicate-coated $Ca(OH)_2$ reduced the initial set time—in many instances providing an initial set time comparable to, or even shorter than, that of the non-aged composition C1. As also seen in TABLE 2, set times decreased as the amount of added silicate-coated Ca(OH)$_2$ increased, and also decreased as the coating level decreased. Thus, the amount of silicate-coated Ca(OH)$_2$ needed to decrease the set time to a particular level increased as the coating level increased. There is some variation in the results reported in TABLE 2 due to, for example, variations in the length of aging, ambient temperature fluctuations, water temperature, and other variables. However, the data reported in TABLE 2 demonstrates that the silicate-coated Ca(OH)$_2$ particles can be used to recover otherwise unusable, aged refractory compositions.

Example 4

Set Times of Fresh and Aged Refractory Compositions Containing Silicate-Coated Ca(OH)$_2$ EXAMPLE 3 demonstrated that silicate-coated Ca(OH)$_2$ particles can be used to recover aged refractory compositions. The testing in EXAMPLE 4 compared the set times of fresh and aged compositions having silicate-coated Ca(OH)$_2$ particles.

The testing described in EXAMPLE 2 was performed using composition C1 of varying age. Specifically, formulations of C1 and the amount of silicate-coated Ca(OH)$_2$ particles of specified coating level were prepared as indicated in TABLE 3 below. The initial set times were determined in accordance with the procedure of EXAMPLE 2, for samples aged 0-8 days, about 6-8 months, and about 14 months. A range of initial set times was observed depending on material age, with the samples aged about 14 months displaying the longest initial set times. TABLE 3 indicates the minimum and maximum observed set times for the specified % additions and coating levels of silicate-coated Ca(OH)$_2$ particles added to the refractory compositions over the range of aging.

TABLE 3

| Level of coating on Ca(OH)$_2$, and % addition to C1 | Minimum set time (hours) | Maximum set time (hours) | Span (hours) |
| --- | --- | --- | --- |
| Base (0% addition) | 17 | No set | — |
| 10% silicate coating, 0.067% addition | 5 | 10.5 | 5.5 |
| 20% silicate coating, 0.075% addition | 6.5 | 12 | 5.5 |
| 30% silicate coating, 0.086% addition | 9 | 12.5 | 3.5 |
| 50% silicate coating, 0.12% addition | 16 | 33.5 | 17.5 |

In general, the minimum set times were observed for the samples that were 0-8 days old. The maximum observed set times corresponded to the samples aged about 14 months The "Span" identified in TABLE 3 above is the difference between the minimum and maximum set times, and indicates the level of consistency in set times. A smaller span indicates less variation in set time for compositions of various ages. Thus, the refractory compositions containing a 0.086% by weight addition of 30% silicate-coated Ca(OH)$_2$ had the smallest span, indicating more consistency in initial set time regardless of age.

Figure 5:
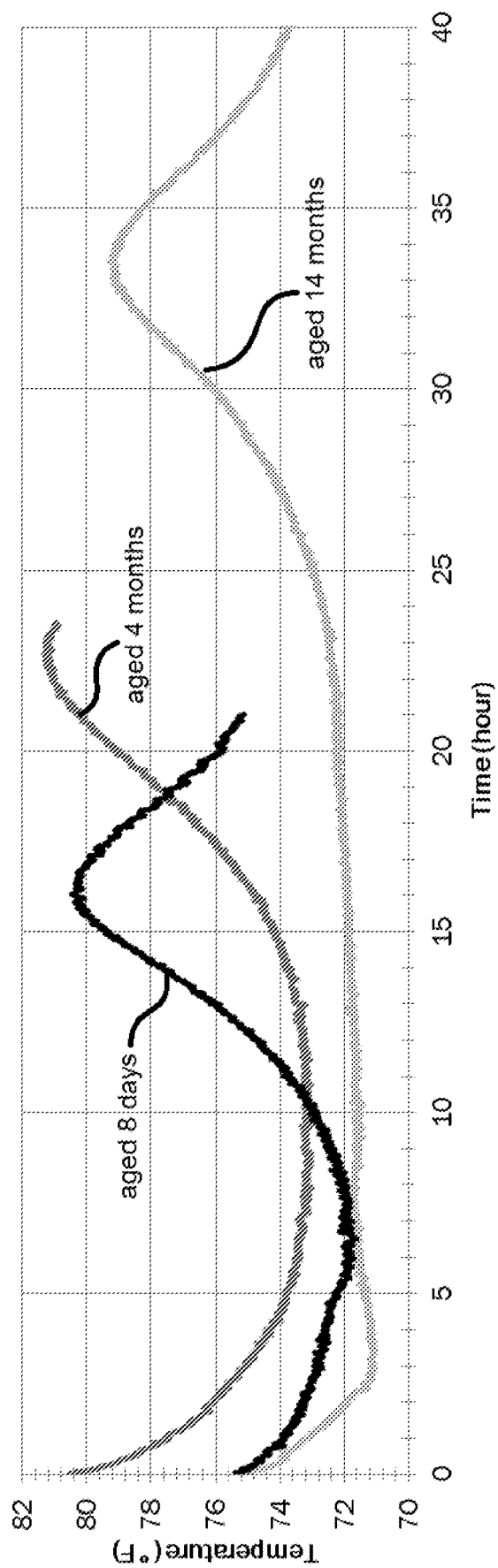
FIG. 5 depicts an exothermic plot for the setting of the low-cement castable refractory of FIG. 1 of various ages, wherein $Ca(OH)_2$ particles having a 50% by weight silicate coating were added to the refractory.

FIGS. 2-5 depict exothermic plots for the various samples tested with a 0.086% addition of 30% silicate-coated Ca(OH)$_2$ to C1 (FIG. 2), a 0.075% addition of 20% silicate-coated Ca(OH)$_2$ to C1 (FIG. 3), a 0.067% addition of 10% silicate-coated Ca(OH)$_2$ to C1 (FIG. 4), and a 0.12% addition of 50% silicate-coated Ca(OH)$_2$ to C1 (FIG. 5). In some instances, the castable composition C1 was aged before the silicate-coated Ca(OH)$_2$ particles were added, as seen in the legends for FIGS. 2-5. In some instances, the composition C1 was aged for a period of time, the silicate-coated Ca(OH)$_2$ particles added, and the mixture aged for an additional period of time. In other instances, aged C1 was tested immediately after the addition of silicate-coated Ca(OH)$_2$ particles.

While composition C1 that has aged 4 months or more did not set for at least 30 hours (see FIG. 1), all of the 4-month old samples containing the silicate-coated Ca(OH)$_2$ particles set in 23 hours or less (considerably less than 23 hours in all bit one instance). In fact, except for instances in which 0.12% of 50% silicate-coated Ca(OH)$_2$ particles were added, even the samples that had been aged about 6 months, or even about 14 months, exhibited set times of less than 13 hours.

For the 4-month and 14-month old C1 samples containing 0.12% of 50% silicate-coated Ca(OH)$_2$ particles, while the set times were 23 and 33.5 hours, respectively, they did, in fact, set (see FIG. 5). The temperature peaks for the 4-month and 14-month old C1 samples containing 0.12% of 50% silicate-coated Ca(OH)$_2$ particles are also significantly more defined, indicating that complete setting was achieved.

In addition, as compared to C1 without the addition of silicate-coated Ca(OH)$_2$ particles, set times were not only significantly decreased (especially for 10-30% coated particles), set times were also more predictable even if the composition was aged. While fresh C1 (without Ca(OH)$_2$ addition) had a predictable set time, aged C1 did not. The addition of silicate-coated Ca(OH)$_2$ particles significantly, and surprisingly, improved set time predictability, as seen in the exothermic plots of FIGS. 2-4. Applicant's test results also demonstrate that the coating level and amount of silicate-coated Ca(OH)$_2$ particles added to a refractory composition can be tailored to provide not only a desired decrease in set time, but also significant reductions in the effect of aging on both set time and set time predictability. The use of silicate-coated rather than uncoated Ca(OH)$_2$ particles also avoids a set time that is too short—such as "flash set" where the workable time for the hydrated composition is less than 10 minutes.

The data reported in FIGS. 2-5 further demonstrates that, not only does the addition of silicate-coated Ca(OH)$_2$ particles provide longer storage stability, but also that the improvement in set time of aged refractory compositions can be obtained by adding the silicate-coated Ca(OH)$_2$ particles to already aged refractory compositions.

While various embodiments of refractory compositions and silicate-coated particles and methods have been described in detail above, it will be understood that the components, features and configurations, as well as the methods of manufacturing the devices and methods described herein are not limited to the specific embodiments described herein.

What is claimed is:
1. A refractory composition comprising:
   (a) refractory aggregate;
   (b) one or more matrix components; and
   (c) silicate-coated set accelerator particles;
wherein said refractory composition is a dry mix,
wherein said silicate-coated set accelerator particles comprise silicate-coated particles of one or more of Ca(OH)$_2$, magnesium hydroxide, calcium chloride, calcium carbonate, magnesium carbonate, lithium carbonate or calcium sulfate, and
wherein said silicate coating is chosen from the group consisting of sodium silicate, potassium silicate lithium silicate and mixtures thereof.

2. The refractory composition of claim 1, wherein said silicate-coated set accelerator particles comprise silicate-coated Ca(OH)$_2$ particles.

3. The refractory composition of claim 2, wherein said silicate-coated set accelerator particles comprise sodium silicate-coated Ca(OH)$_2$ particles.

4. The refractory composition of claim 1, wherein the silicate coating comprises 5% to 70% by weight of the set accelerator particles.

5. The refractory composition of claim 1, wherein the silicate coating comprises 5% to 60% by weight of the set accelerator particles.

6. The refractory composition of claim 2, wherein the silicate coating comprises 5% to 60% by weight of the set accelerator particles.

7. The refractory composition of claim 3, wherein the sodium silicate coating comprises 10% to 50% by weight of the set accelerator particles.

8. The refractory composition of claim 1, wherein the composition comprises 0.01% to 0.5% by weight of the silicate-coated set accelerator particles.

9. The refractory composition of claim 2, wherein the refractory composition comprises 0.01% to 0.5% by weight of the silicate-coated Ca(OH)$_2$ particles.

10. The refractory composition of claim 6, wherein the refractory composition comprises 0.01% to 0.5% by weight of the silicate-coated Ca(OH)$_2$ particles.

11. The refractory composition of claim 7, wherein the refractory composition comprises 0.01% to 0.5% by weight of the silicate-coated Ca(OH)$_2$ particles.

12. The refractory composition of claim 1, further comprising a binder.

13. The refractory composition of claim 12, wherein said binder is chosen from the group consisting of calcium aluminate cement, hydratable alumina, phosphate binder, alkali silicate binder, microsilica gel bond binder, colloidal silica and colloidal alumina.

14. The refractory composition of claim 12, wherein said binder comprises calcium aluminate cement.

15. The refractory composition of claim 1, wherein said silicate-coated set accelerator particles further comprise an anti-caking agent, said anti-caking agent chosen from the group consisting of silica, talc, sodium aluminosilicates, diatomaceous earth, cellulose, clay, polymer particles, and mixtures thereof.

16. The refractory composition of claim 1, wherein said aggregate includes one or more of alumina, bauxite, mullite, bauxitic kaolin, andalusite, calcined kaolin, chamotte, calcined flint clay, pyrophyllite, fused silica, bubble alumina, lightweight clay grog, bubble fly ash, perlite, haydite, vermiculite, fused or sintered magnesia alumina spinels, fused or sintered alumina-zirconia-silica, magnesia, calcium hexaluminate, fused calcium aluminate clinker, sintered calcium aluminate clinker, and lightweight calcium hexaluminate.

17. The refractory composition of claim 1, wherein said matrix components comprise one or more of calcined alumina, reactive alumina, silicon carbide, quartz silica, fume silica, magnesia, kyanite, mullite, spinel (MgAl$_2$O$_4$), clay, zircon, graphite, and fly ash.

18. A refractory composition comprising:
   (a) refractory aggregate;
   (b) one or more matrix components; and
   (c) silicate-coated set accelerator particles;
wherein said refractory composition is a dry mix, and said silicate-coated set accelerator particles further comprise an anti-caking agent, said anti-caking agent chosen from the group consisting of silica, talc, sodium aluminosilicates, diatomaceous earth, cellulose, clay, polymer particles, and mixtures thereof.

19. A refractory composition comprising:
   (a) refractory aggregate;
   (b) one or more matrix components; and
   (c) silicate-coated set accelerator particles, wherein said silicate-coated set accelerator particles comprise silicate-coated particles of Ca(OH)$_2$;
wherein said refractory composition is a dry mix.

* * * * *